United States Patent [19]

Jones et al.

[11] Patent Number: 4,646,590

[45] Date of Patent: Mar. 3, 1987

[54] TEMPORARY KEY TEMPLATE

[76] Inventors: Brian W. Jones, 1957 Brandywine Dr., Columbus, Ohio 43220; Richard L. Hagens, 2090 Ellington Rd., Columbus, Ohio 43221

[21] Appl. No.: 800,287

[22] Filed: Nov. 21, 1985

[51] Int. Cl.⁴ .............................................. B23C 3/35
[52] U.S. Cl. ...................................... 76/110; 409/82; 409/84
[58] Field of Search ...................... 76/110; 409/81, 82, 409/84

[56] References Cited

U.S. PATENT DOCUMENTS

| Re. 26,848 | 4/1970 | Simon | 76/110 |
|---|---|---|---|
| 1,254,442 | 1/1918 | Smith | 409/82 |
| 3,791,240 | 2/1974 | Meoni | 409/84 |
| 3,810,416 | 5/1974 | Nelms, Jr. | 409/82 |
| 3,919,920 | 11/1975 | Schlage | 409/82 |

*Primary Examiner*—Roscoe V. Parker
*Attorney, Agent, or Firm*—Larson and Taylor

[57] ABSTRACT

A kit and method for constructing a temporary key template from a key code of a lock having pin tumblers is disclosed. The temporary key template is used as a master in order to make a permanent duplicate key having appropriate serrations from a suitable uncut key. The kit includes a converter blank key having an elongate bar in which a plurality of apertures are provided. These apertures are spaced at predetermined distances from one another which correspond to the respective distances between the pin tumblers of the lock. A plurality of different pins are provided which are adapted to be inserted into any of the apertures so that a predetermined upper portion of the pin extends above the elongate bar. The particular pin need for an aperture is determined by the key code so that by filling the appropriate apertures with appropriate pins, a temporary key template is constructed which is easily duplicated on a conventional key duplicating machine. The converter blank key preferably includes a stop member from which the elongate bar extends and a mechanism for holding the pins in the apertures. The diameters of the upper portions of the pins is preferably slightly smaller that the spacing between the apertures where the apertures are evenly spaced.

12 Claims, 1 Drawing Figure

U.S. Patent  Mar. 3, 1987  4,646,590
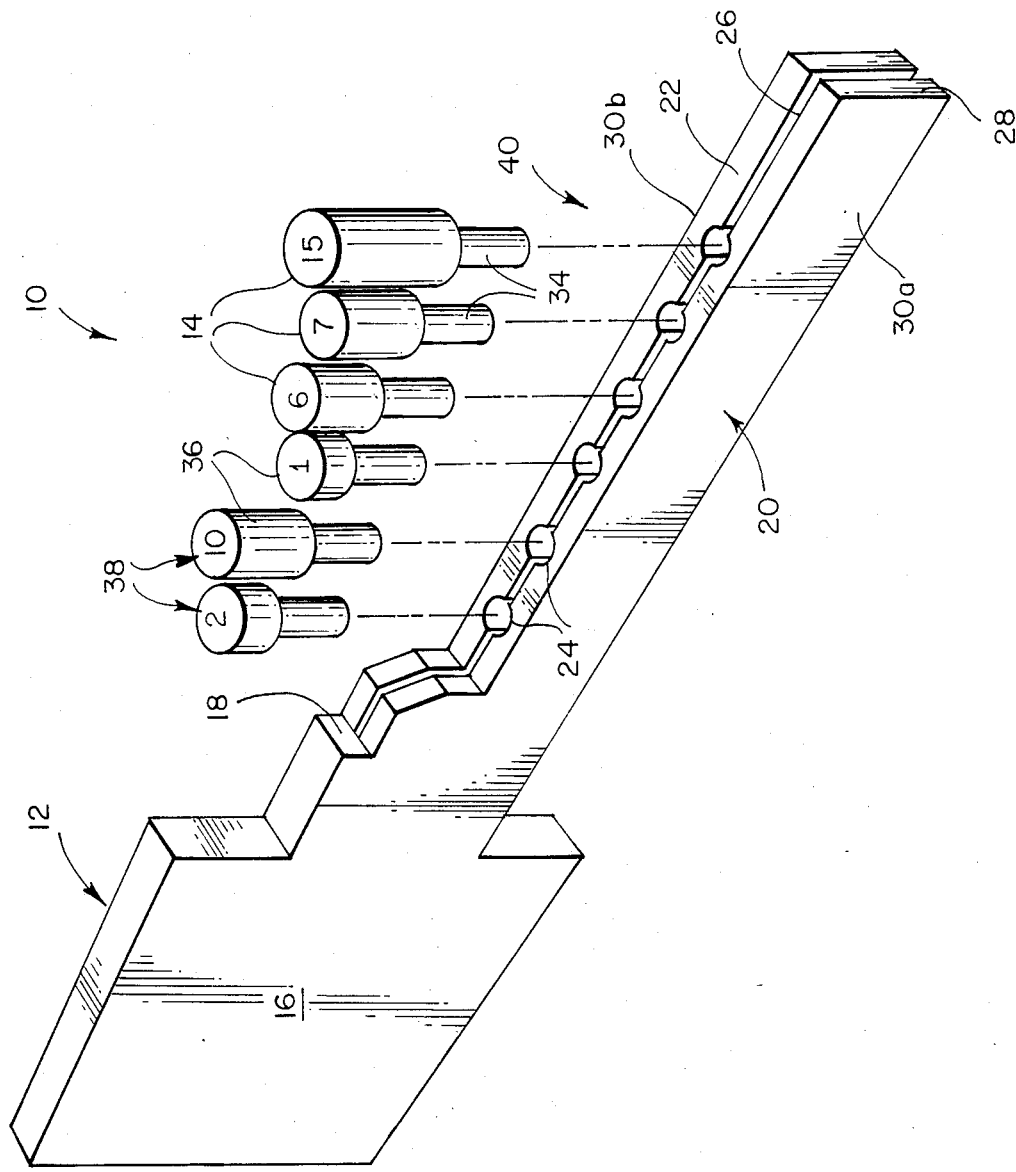

TEMPORARY KEY TEMPLATE

FIELD OF THE INVENTION

The present invention relates generally to the field of providing a duplicate key from a key code of a lock having pin tumblers, and more particularly to the constructing of a temporary key template from the key code from which a permanent duplicate key is then made.

BACKGROUND OF THE INVENTION

Many locks of the pin tumbler type include an identifying key code. This key code indicates the order and various height of the serrations of the key which are necessary to operate the particular lock. Ordinarily, when a duplicate key is required for a lock of this type, a duplicate key is simply cut from an appropriate blank using the original key as a master. Machines for cutting a duplicate key from a master key of this type are well known to those of ordinary skill in the art. However, where a key to the lock is no longer available (typically lost), it is a relatively laborious and time consuming process to construct a new key from a suitable blank even where the height of the serrations is known from the key code of a lock.

In order to cut a new key for a lock where no key currently is available, it has been proposed in the prior art to use a simple key duplicating machine as disclosed in U.S. Pat. No. 3,791,240 (Meoni). According to the disclosure in this patent, this is accomplished by providing a plurality of master blanks each one of which is individually sized to produce a cut at a single certain location and to a single certain depth. While such a method would be successful, it is apparent that a great number of master blanks are necessary. In addition, it is relatively time consuming to clamp, cut and then unclamp each master blank for each serration which must be cut in the duplicate key.

Also disclosed in the prior art is a method for cutting blank keys using the lock cylinder from the lock. These methods are disclosed in U.S. Pat. No. RE 26,848 (Simon) and U.S. Pat. No. 1,254,442 (Smith). According to this method, the lock cylinder is removed from the lock and a blank (uncut) key is inserted in the lock cylinder. This causes the cylinder pins to extend from the lock cylinder a distance corresponding to the depth of cut needed in a blank key to fit this lock cylinder. A special apparatus is then needed for cutting a blank key at locations and to a depth corresponding to the pins sticking up from the lock cylinder.

SUMMARY OF THE INVENTION

In accordance with the present invention, a kit for constructing a temporary key template from a key code of a lock having pin tumblers is provided. By use of the temporary key template, a permanent duplicate key having appropriate serrations is then cut using an ordinary key duplicating machine. This kit includes a converter blank key which has an elongate bar. The elongate bar includes an upper face and a plurality of apertures in the elongate bar along this upper face. These apertures are spaced at predetermined distances from one another which distances correspond to the respective distances between the pin tumblers of the lock. The kit also includes a plurality of different pins. Each pin includes an end portion which is adapted to be inserted into any of the apertures in the elongate bar such that a predetermined upper upper portion of the pin extends above the face of the elongate bar. Thus, by appropriately correlating the key code of the lock to a corresponding aperture and a pin for that aperture having a selected upper portion height, a temporary key template is constructed. This temporary key template is then simply inserted into any of the various key duplicating machines well known to those of ordinary skill in the art in order to cut a permanent duplicate key using the temporary key template as a master.

In the preferred embodiment of the present invention, a means for holding the pins in the apertures along the elongate bar is provided. Preferably, this holding means is provided by slitting the free portion of the elongate bar centrally along the apertures. This allows the end portions of the pins to be easily inserted into the appropriate apertures. However, when the temporary key template is clamped into the duplicating machine, the split sides of the elongate bar are pushed together holding the pins in place.

Preferably, the pins include a cylindrically shaped end portion and a cylindrically shaped upper portion adjacent the end portion. The upper portion has a greater diameter than the diameter of the end portion so that the pins are simply inserted into the apertures by introducing the end portions into aperture until the upper portions contact the upper face of the elongate bar. Conveniently, the diameter of the upper cylindrical portion is slightly less than the distance between adjacent apertures so that no significant gaps are left between adjacent pins in the elongate bar which might be duplicated in the duplicate key if sufficiently large.

For convenience, the converter blank key also includes a stop member from which the elongate bar extends and from which the apertures are precisely spaced in accordance with the spacing of the appropriate serrations from the corresponding stop member of the needed duplicate key. The converter blank key preferably further includes a handle portion such that the converter blank key is substantially key shaped.

According to the method of the present invention, a duplicate key for a lock is made by first determining the key code of a lock. Next, a temporary key template is constructed by selecting an appropriate converter blank key and inserting appropriate pins into the apertures of the converter blank key which are indicated by the key code. Finally, a duplicate key is cut having appropriately sized and located serrations using the constructed temporary key template and pins extending therefrom as a master.

It is an advantage of the present invention that common key duplicating machines are readily used to cut a new duplicate key from the temporary key template of the present invention. It should be appreciated that very little training is needed for the operator to quickly and easily make a duplicate key from a temporary key template according to the present invention.

It is also an advantage of the present invention that the new duplicate key produced from the temporary key template is cut according the the original specifications for the lock and thus should fit exactly.

It is a further advantage of the present invention that rather than cutting sharp teeth in the new duplicate key, the serrations provided are cut in steps which reduces wear on the lock pins contained in the lock.

Still another advantage of the present invention for users having a large number of locks is that duplicate keys need not be kept by the user when the duplicate keys are used only at rare occasions when the original key is lost. Instead, all that need be kept is the listing of the locks and the corresponding key codes so that a duplicate key can be quickly and easily cut when the occasion arises. This is particularly advantageous for situations where a large number of duplicate keys which are rarely used must be kept and stored. Another advantage of not having to keep a duplicate key is the added security from not having these keys available to be lost or stolen.

Other features and advantages of the present invention are stated in or apparent from a detailed description of a presently preferred embodiment of the invention found hereinbelow.

BRIEF DESCRIPTION OF THE DRAWINGS

The single figure is an exploded view of a temporary key template according to the present invention.

DETAILED DESCRIPTION OF THE PREFERRED EMBODIMENT

With reference the drawings in which like numerals represent like elements, a kit 10 for constructing a temporary key template from a key code of a lock having pin tumblers is depicted. Kit 10 includes a converter blank key 12 and a plurality of pins 14 of which six are shown. Converter blank key 12 includes a handle portion 16, a stop member 18, and an elongate bar. With this construction, converter blank key 12 is substantially key shaped.

As shown, elongate bar 20 includes an upper face 22 in which a plurality of apertures 24 are provided. Apertures 24 are spaced along upper face 22 a distance which corresponds to the spacing and position of the pin tumblers in a specified type of lock. Thus, it should be appreciated that converter blank key 12 is only exemplary and a greater or lesser number of apertures having different spacings may be appropriate for different types of lock.

In this preferred embodiment, elongate bar 20 also includes a slit 26 which extends along upper face 22 centrally of apertures 24 and through elongate bar 20 from a free end 28 of elongate bar 24 to stop member 18. Thus, elongate bar 20 is split into two bar portions 30a and 30b which are joined together adjacent stop member 18.

As shown, the plurality of pins 14 come in a variety of sizes. However, each pin 14 includes a cylindrical end portion 34 having a standard length. As indicated, end portion 34 is adapted to be received in any one of apertures 24 and is thus sized only slightly smaller than each aperture 24. Located above each end portion 34 is an upper cylindrical portion 36. Upper cylindrical portions 36 of each pin 14 are shown having variable heights. The particular height of each upper portion 36 is indicated by an indicia 38 at the top thereof.

It should be appreciated that bar portions 30a and 30b form a holding means 40 for retaining end portions 34 of pin 14 in elongate bar 20. By simply pressing bar portions 30a and 30b together, end portions 34 of pin 14 are trapped in apertures 24 and held securely therein.

In operation, kit 10 functions in the following manner to produce a temporary key template from a key code of a lock having pin tumblers. Initially, it must be determined what brand of lock the duplicate key is to be produced for and the particular key code for that lock. As mentioned above, different brands of locks may have different numbers of pin tumblers and the coding for each brand of lock also varies. By reference to a suitable cross reference table or by having a dedicated kit for each particular brand of lock, a suitable cross reference converter blank key 12 is chosen. Next, also using a suitable table, the individual codes of the key code are looked up and a particular pin 34 is indicated by each particular code of the key code. Conveniently, each pin 14 having a particular height of upper portion 36 is identified by an indicia 38 such as the numbers depicted. In addition, the order of the key code also indicates the order of the pins 34 to be inserted in aperture 24. Thus, after converting the first code of the key code, the appropriate pin is selected and inserted in the appropriate aperture 24, typically the first or last aperture 24 of converter blank key 12. It should be appreciated that pins 14 are inserted into converter blank key 12 so that end portions 34 are fully received within a respective aperture 24 and thus upper cylindrical portions 36 contact upper face 22. This procedure is followed for each additional pin 34 until all of the appropriate apertures 24 have received a pin 34 therein.

After suitably constructing the temporary key template from converter blank key 12 and pins 14, the temporary key template is suitably duplicated using any of the known prior art duplicating machines well known to those of ordinary skill in the art. Typically, such duplicating machines include a clamping member for clamping the temporary key template in position to be duplicated. As this occurs, bar portions 30a and 30b are pressed towards one another to securely hold pins 14 in place. Then, a suitable tracing arm is moved along elongate bar 20 to trace the pattern of pins 14 extending from upper face 22. This causes the cutting or grinding of a duplicate key which then has serrations at the same heights and locations as the tops of pin 14. It should be appreciated that the upper cylindrical portions 36 of pins 14 have a diameter which is only slightly less than the distance between adjacent apertures 24 in order to provide a relatively smooth, stepwise surface to the traced.

After cutting of the duplicate key is completed, the temporary key template is simply unclamped from a duplicating machine and pin 14 removed from converted blank key 12. Thus, the next time a duplicate key for a different lock is needed, converter blank key 12 is again used with a new selection of pins 14 to produce a temporary key template which can be duplicated.

It should be appreciated that the duplicate key which is produced from the temporary key template is cut to the original manufacturer's specifications using the key code of the lock. Thus, the duplicate key should function as well as any original key.

It should also be appreciated that the duplicate key produced has serrations which are formed in a step-like manner rather than in a teeth-like manner for normal keys. Such a step-like formation is advantageous as less wear and tear is produced on the pin tumblers as the duplicate key is introduced into the lock during subsequent use.

It should further be appreciated that the present invention is readily usable with minimal training. The concept by which a temporary key template is constructed from the converter blank key and pins of the present invention is readily understandable and the cutting of a duplicate key therefrom readily performed by those who normally duplicate keys.

Although a holding means 40 has been disclosed for retaining pins 14 and apertures 24 of elongate bar 20, it should be appreciated that alternate means are available for holding pins 14 in apertures 24. For example, pins 14 could be magnetized and elongate bar 20 made out of a suitable ferric metal.

Thus, although the present invention has been described with respect to exemplary embodiments thereof, it will be understood by those of ordinary skill in the art that variations and modifications can be affected within the scope and spirit of the invention.

We claim:

1. A kit for constructing a temporary key template from a key code of a lock having pin tumblers, the temporary key template then being used as a master in order to make a permanent duplicate key having appropriate serrations from a suitable uncut key, the kit comprising:
    a converter blank key having an elongate bar, said elongate bar including an upper face and a plurality of apertures in said elongate bar along said upper face, said apertures being spaced at predetermined distances from one another which distances correspond to the respective distances between the pin tumblers of the lock; and
    a plurality of different pins, each said pin including an end portion which is adapted to be inserted into any of said apertures in said elongate bar such that a predetermined upper portion of said pin extends above said face of said elongate bar;
    whereby a temporary key template is constructed, from which a permanent duplicate key is easily cut from the suitable uncut key, by inserting into the corresponding said apertures of said elongate bar selected said pins which extend above said face of said elongate bar a desired distance for duplicating the desired serrations on the duplicated key.

2. A kit as claimed in claim 1 wherein said elongate bar of said converter blank key includes a means for holding said pins in said apertures.

3. A kit as claimed in claim 2 wherein said elongate bar includes a free end; and wherein said holding means includes a slit centrally along said apertures and through said elongate bar from said free end to a position beyond the most distant of said apertures.

4. A kit as claimed in claim 1 wherein said end portions of said pins are cylindrically shaped.

5. A kit as claimed in claim 4 wherein each said pin includes an upper cylindrical portion adjacent said end portion which said upper portion has a greater diameter than the diameter of said end portion.

6. A kit as claimed in claim 5 wherein the diameter of said upper cylindrical portion is slightly less than the distance between adjacent apertures.

7. A kit as claimed in claim 1 wherein said converter blank key further includes a stop member from which said elongate bar extends.

8. A kit as claimed in claim 7 wherein said converter blank key further includes a handle portion such that said converter blank key is substantially key shaped.

9. A kit as claimed in claim 1 wherein said converter blank key includes a stop member from which said elongate bar extends; wherein said elongate bar includes a means for holding said pins in said apertures; and wherein said end portion of said pins are cylindrically shaped and the remainder of said pins are cylindrically shaped with a diameter greater than the diameter of said ends.

10. A method of making a duplicate key for a lock having pins tumblers using a key code for the lock comprising the steps of:
    determining the key code of the lock;
    constructing a temporary key template to serve as a master key from which the duplicate key is subsequently cut, said constructing step including the steps of (a) selecting a converter blank key having an elongate bar with an upper face and apertures spaced along the upper face at distances equal to the separation distances of the pin tumblers of the lock, and (b) inserting selected pins into designated apertures which extend a predetermined height above the upper face of the elongate bar as indicated by reference to the key code; and
    cutting a duplicate key having appropriately sized and located serrations using the constructed temporary key template as a master to be duplicated.

11. A method of making a duplicate key as claimed in claim 10 wherein the elongate bar includes a central slit along the apertures and through the elongate bar such that two bar portions are formed; and further including the step of clamping the bar portions together to hold the pins therein as the temporary key template is duplicated.

12. A method of making a duplicate key as claimed in claim 11 wherein each pin includes a cylindrical end portion and a cylindrical upper portion having a greater diameter than the end portion; and wherein the inserting step includes the inserting of the end portions of the selected pins into the respective apertures until the upper portions contact the upper face of the elongate bar.

* * * * *